(12) United States Patent
Yeh

(10) Patent No.: US 6,478,616 B1
(45) Date of Patent: Nov. 12, 2002

(54) CONNECTOR ASSEMBLY WITH INTERNAL SOUND CARD

(75) Inventor: Joel J. Yeh, San Gabriel, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/033,665

(22) Filed: Dec. 26, 2001

(51) Int. Cl.[7] .............................................. H01R 13/60
(52) U.S. Cl. ................................................... 439/541.5
(58) Field of Search ........................... 439/541.5, 76.1

(56) References Cited

U.S. PATENT DOCUMENTS

| | | | | |
|---|---|---|---|---|
| 5,643,008 A | * | 7/1997 | Tan et al. ................. | 439/541.5 |
| 5,713,747 A | * | 2/1998 | Hsia et al. ............... | 439/541.5 |
| 5,775,923 A | * | 7/1998 | Tomioka .................. | 439/541.5 |
| 5,954,522 A | * | 9/1999 | Ho et al. .................. | 439/541.5 |
| 6,027,370 A | * | 2/2000 | Hsu et al. ................. | 439/541.5 |
| 6,056,594 A | * | 5/2000 | Ching ...................... | 439/541.5 |
| 6,168,462 B1 | * | 1/2001 | Liao ........................ | 439/541.5 |
| 6,174,198 B1 | * | 1/2001 | Wu et al. ................. | 439/541.5 |
| 6,183,292 B1 | * | 2/2001 | Chen et al. .............. | 439/541.5 |

* cited by examiner

*Primary Examiner*—Gary Paumen
(74) *Attorney, Agent, or Firm*—Wei Te Chung

(57) ABSTRACT

An electrical connector assembly (20) includes a D-Sub connector (40), a triplex audio jack connector (50), and a board edge connector (60) all mounted to a sound card (70), the whole being assembled into a connector housing (30) having a rear cover (80) with a shielding plate (90). The board edge connector is mountable to a motherboard (100). The result is a sound package including sound card and connectors which takes up less space on the motherboard than separate sound card and connectors. The new connector assembly with internal sound card thus results in greater efficiency.

3 Claims, 17 Drawing Sheets

CONNECTOR ASSEMBLY WITH INTERNAL SOUND CARD

BACKGROUND OF THE INVENTION

1. Field of the Invention

The present invention relates to an electrical connector assembly, and particularly to an electrical connector assembly having a sound card mounted internal to the assembly.

2. Description of the Related Art

Many prior art modular jacks were mounted singly on a motherboard, and audio circuitry was included on the motherboard. Creating a separate sound card improved the use of space on the motherboard, and including more than one modular jack in a housing, particularly in a stacked configuration, led to a further savings of printed circuit board "real estate".

U.S. Pat. No. 5,643,008, as shown in FIG. 17, is one example of a prior art connector assembly which saves board space. The connector assembly 110 has a dielectric housing 112 with a D-sub connector 160 mounted on top of the housing, and a triplex audio jack assembly 130 mounted in the housing below the D-sub connector. The terminals 163 of the D-Sub connector are bent to connect to a printed circuit board (not shown) beneath the connector assembly 110, and must be in two sizes, a longer size for contacts in the upper row of the D-Sub connector, and a shorter size for contacts in the lower row. Contacts 132 of the audio jack assembly also connect to the PCB beneath the connector assembly. A rear shield 150 covers the assembly to provide EMI protection. Although more efficient than discrete connectors, this assembly and related sound card still take up quite a bit of space.

Further miniaturization is desired.

SUMMARY OF THE INVENTION

A first object of the present invention is to provide an electrical connector assembly with a miniaturized sound card installed inside the assembly housing, thereby minimizing use of space in electronic equipment.

A second object of the present invention is to provide an electrical connector assembly which is simple to manufacture.

An electrical connector assembly in accordance with the present invention comprises a D-Sub connector and a triplex audio jack connector mounted to a printed circuit board. The printed circuit board is mounted at its lower edge to a board edge connector. The subassembly is inserted into an assembly housing and the D-Sub connector is fixed to the housing together with a pair of grounding anchors by a pair of locking fasteners. A rear cover having a shielding plate affixed to it is attached to a back of the assembly housing, effectively enclosing the connectors and printed circuit board inside the housing and rear cover. The printed circuit board can contain all the functions of a sound card, making the electrical connector assembly a complete sound card assembly. The electrical connector assembly can then be mounted to a motherboard. Due to its small size, the assembly efficiently provides all the functions of a sound card and associated connectors at a savings in occupied space.

Other objects, advantages and novel features of the invention will become more apparent from the following detailed description of the present embodiment when taken in conjunction with the accompanying drawings.

DETAILED DESCRIPTION OF THE INVENTION

Figure 1:
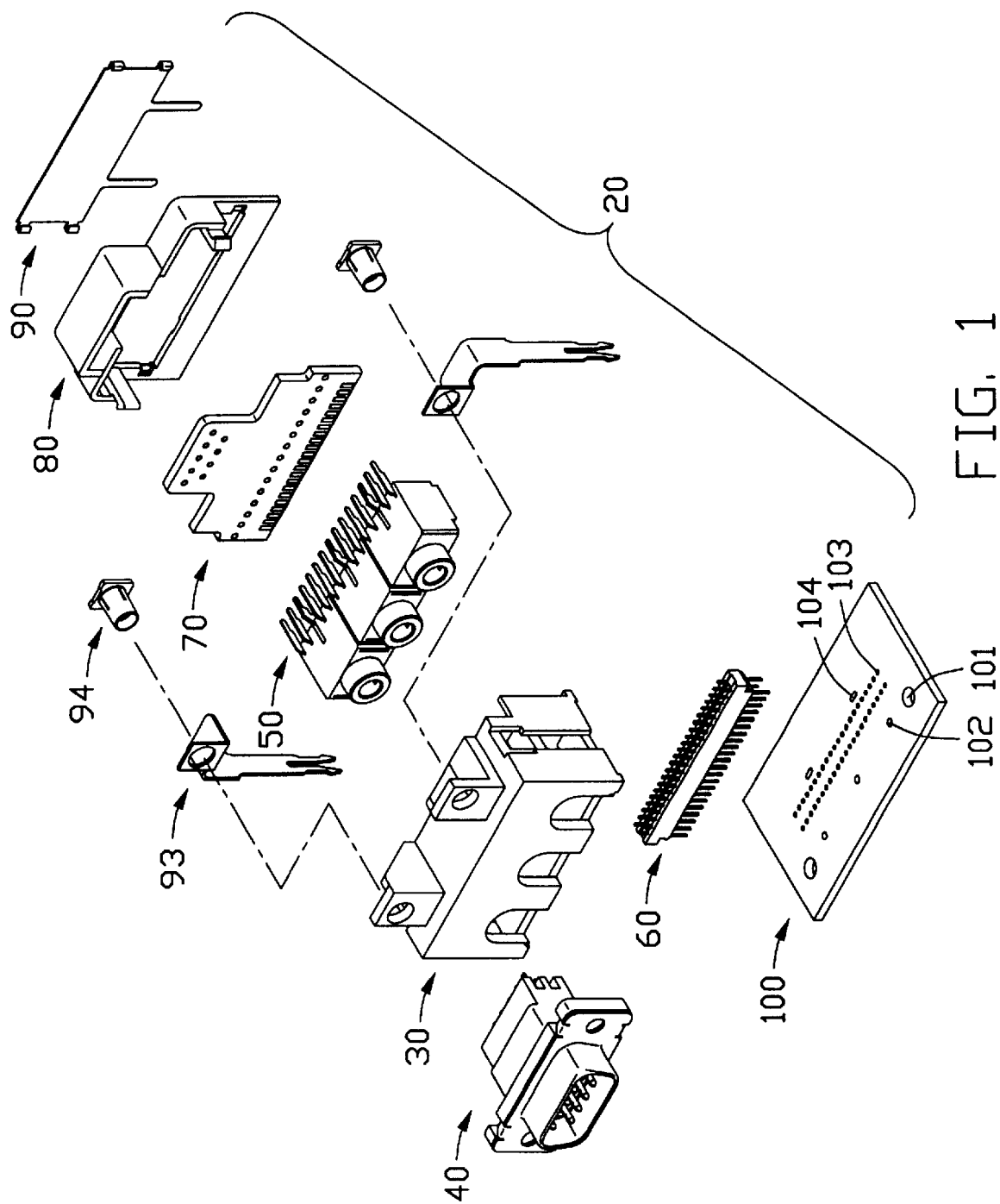
FIG. 1 is an exploded, perspective view of an electrical connector assembly in accordance with the present invention.
Figure 2:
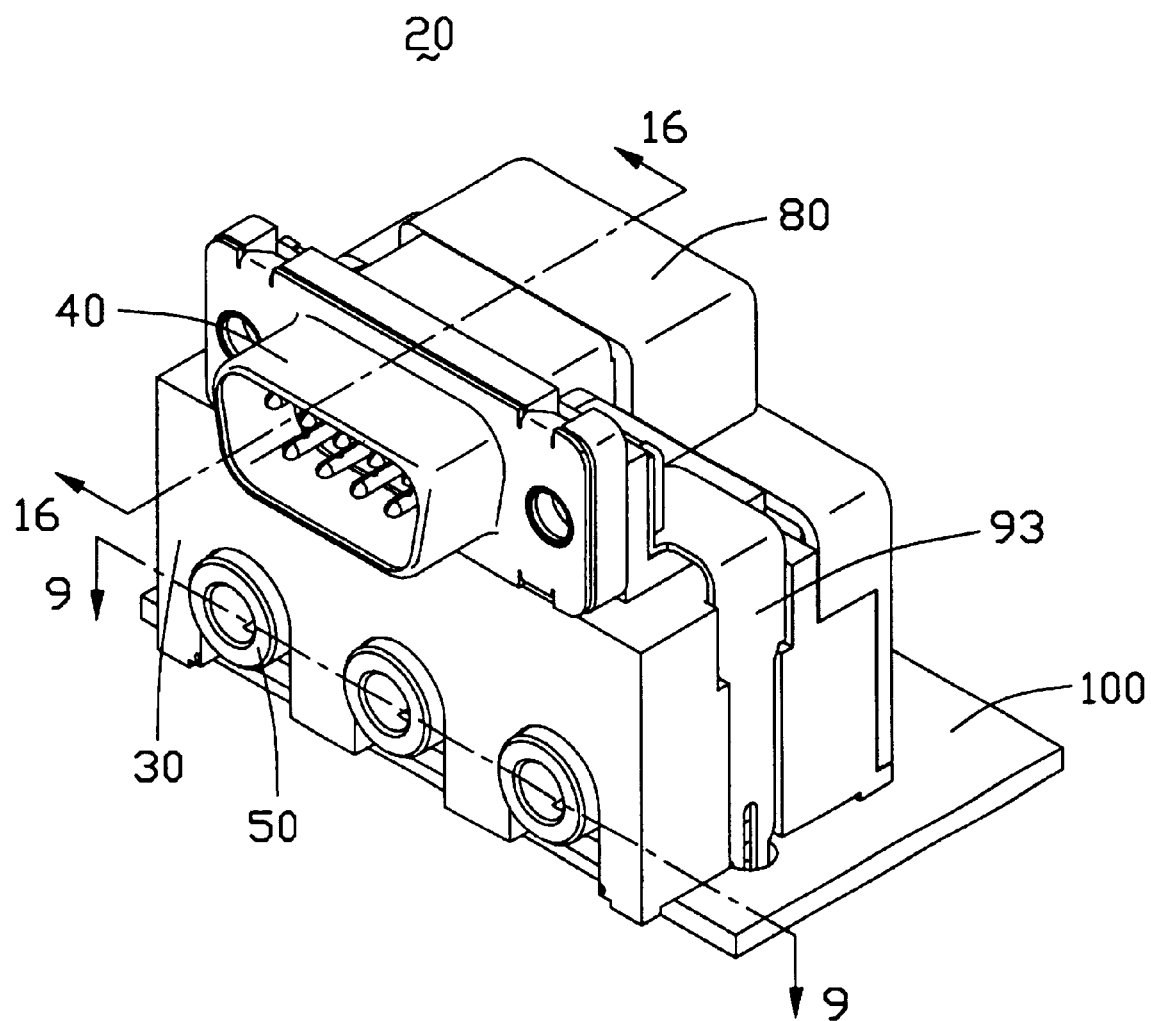
FIG. 2 is a perspective view of the assembled electrical connector assembly of FIG. 1.

Referring to FIGS. 1–2, an electrical connector assembly 20 in accordance with the present invention comprises a dielectric assembly housing 30, a D-Sub connector 40, a triplex audio jack connector 50, a board edge connector 60, a printed circuit board 70, a dielectric rear cover 80, a conductive shielding plate 90, a pair of conductive grounding anchors 93 and a pair of conductive locking fasteners 94. The electrical connector assembly 20 is designed to mount to a motherboard 100.

Figure 3:
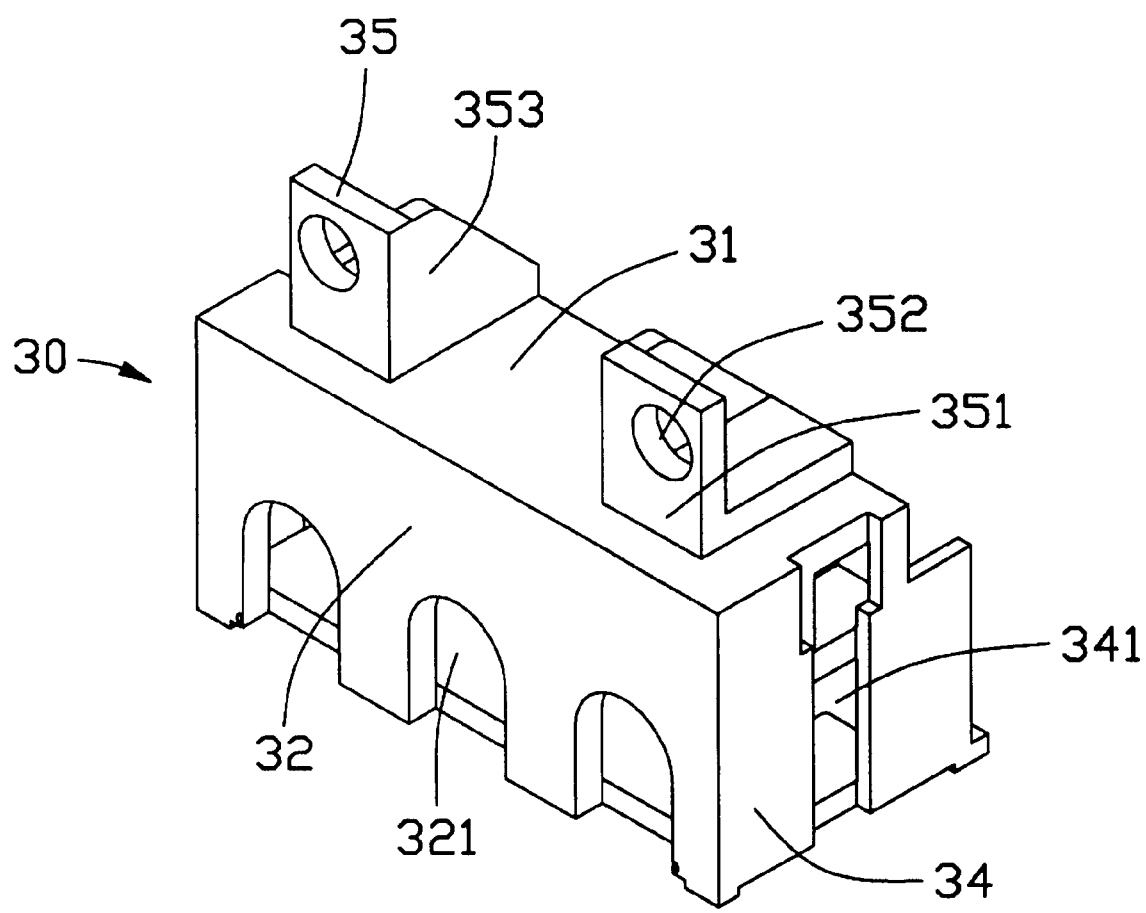
FIG. 3 is a perspective view of a housing of the electrical connector assembly of FIG. 1 from a front aspect.
Figure 4:
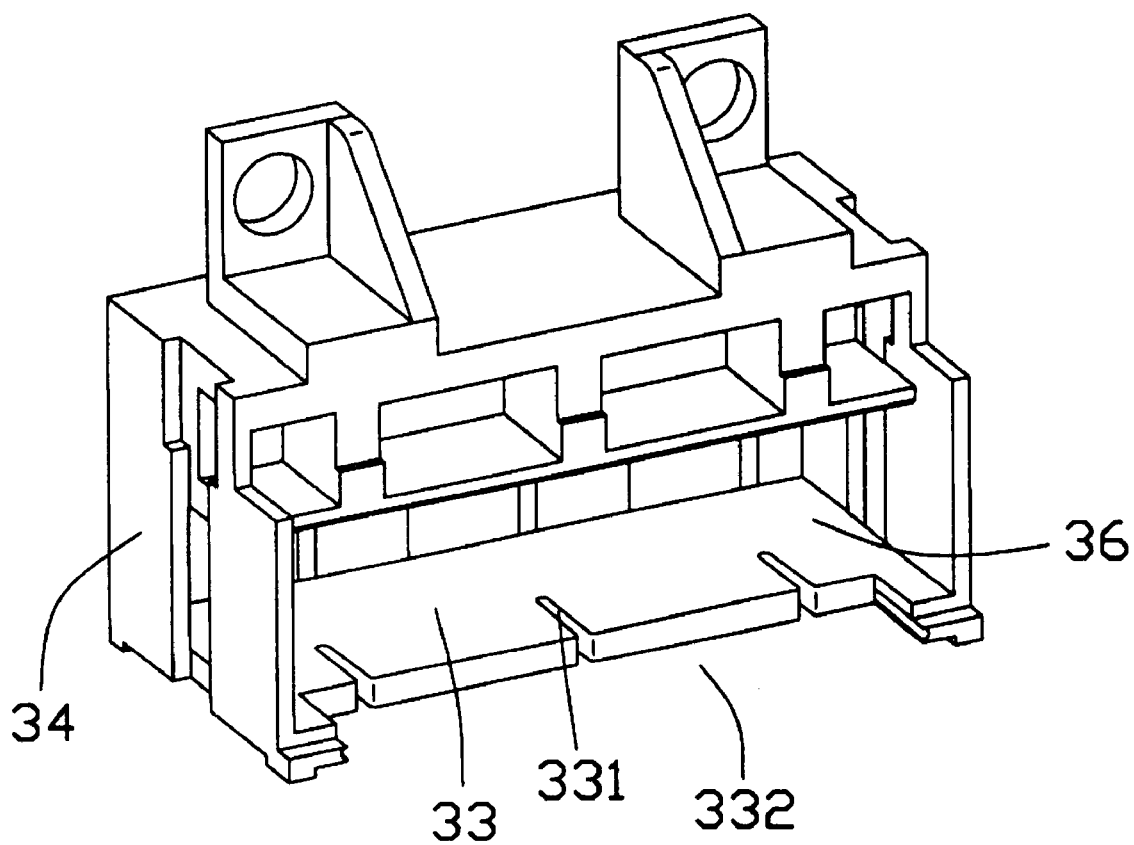
FIG. 4 is a perspective view of the housing of FIG. 3 from a rear aspect.

Referring also to FIGS. 3 and 4, the assembly housing 30 is rectangular in shape with a pair of mounting ears 35 extending upward from a top wall 31 thereof. The housing further has a front wall 32, a bottom wall 33, and a pair of opposing sidewalls 34 defining an insertion cavity 36 therebetween. The front wall 32 defines three port holes 321 in a lower portion thereof. The bottom wall 33 defines a connector mounting slot 332 in a rear side thereof and three grounding slots 331 defined forward from the connector mounting slot 332. The sidewalls 34 each define two strap slots 341 from a top to a bottom thereof. The ears 35 feature a front ear plate 351 defining a first mounting hole 352 therethrough and a side buttress 353.

Figure 5:
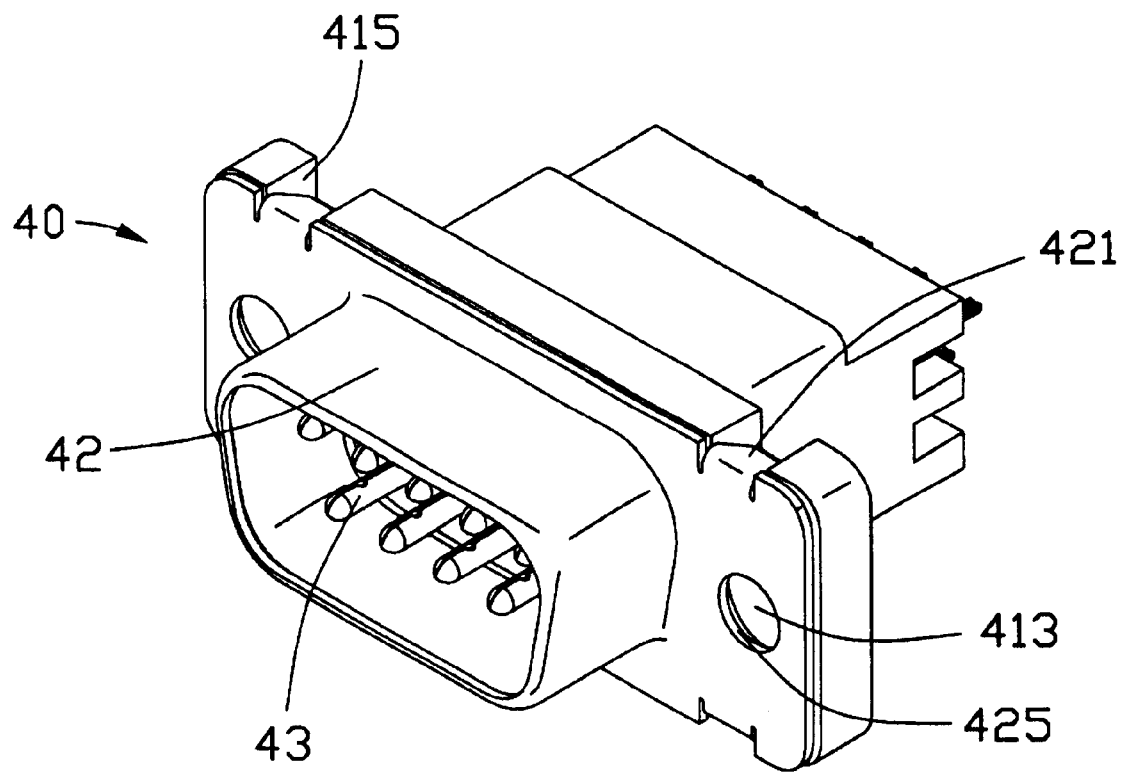
FIG. 5 is a perspective view of a D-sub electrical connector subassembly of the electrical connector assembly of FIG. 1 from a front aspect.
Figure 6:
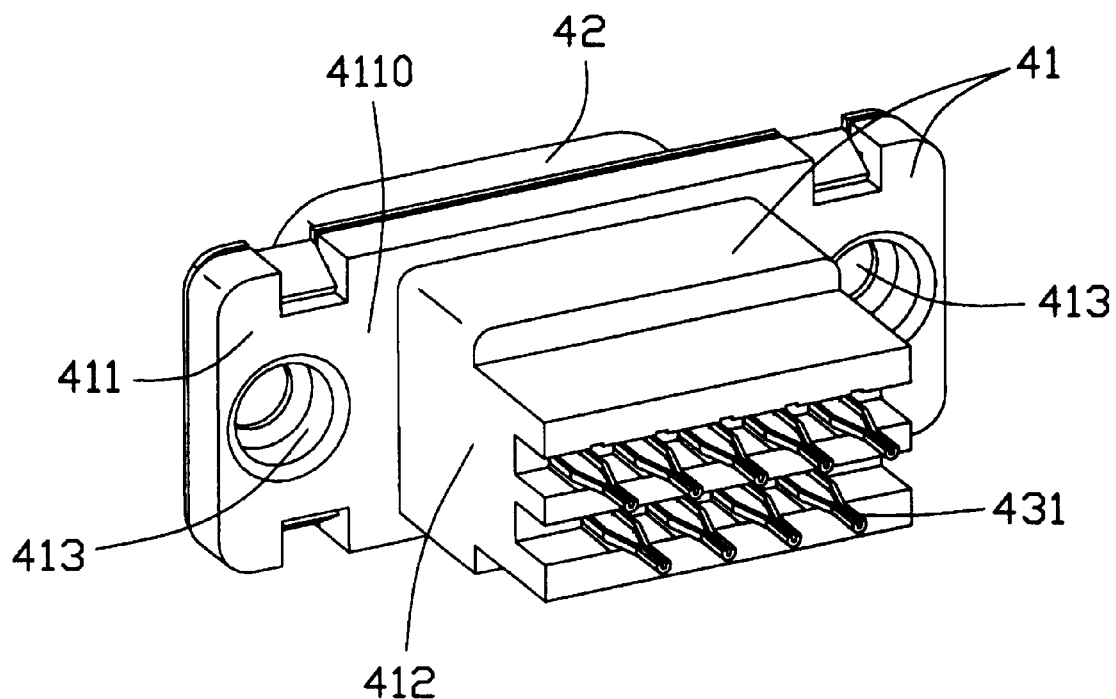
FIG. 6 is a perspective view of the D-sub electrical connector subassembly of FIG. 5 from a rear aspect.
Figure 16:
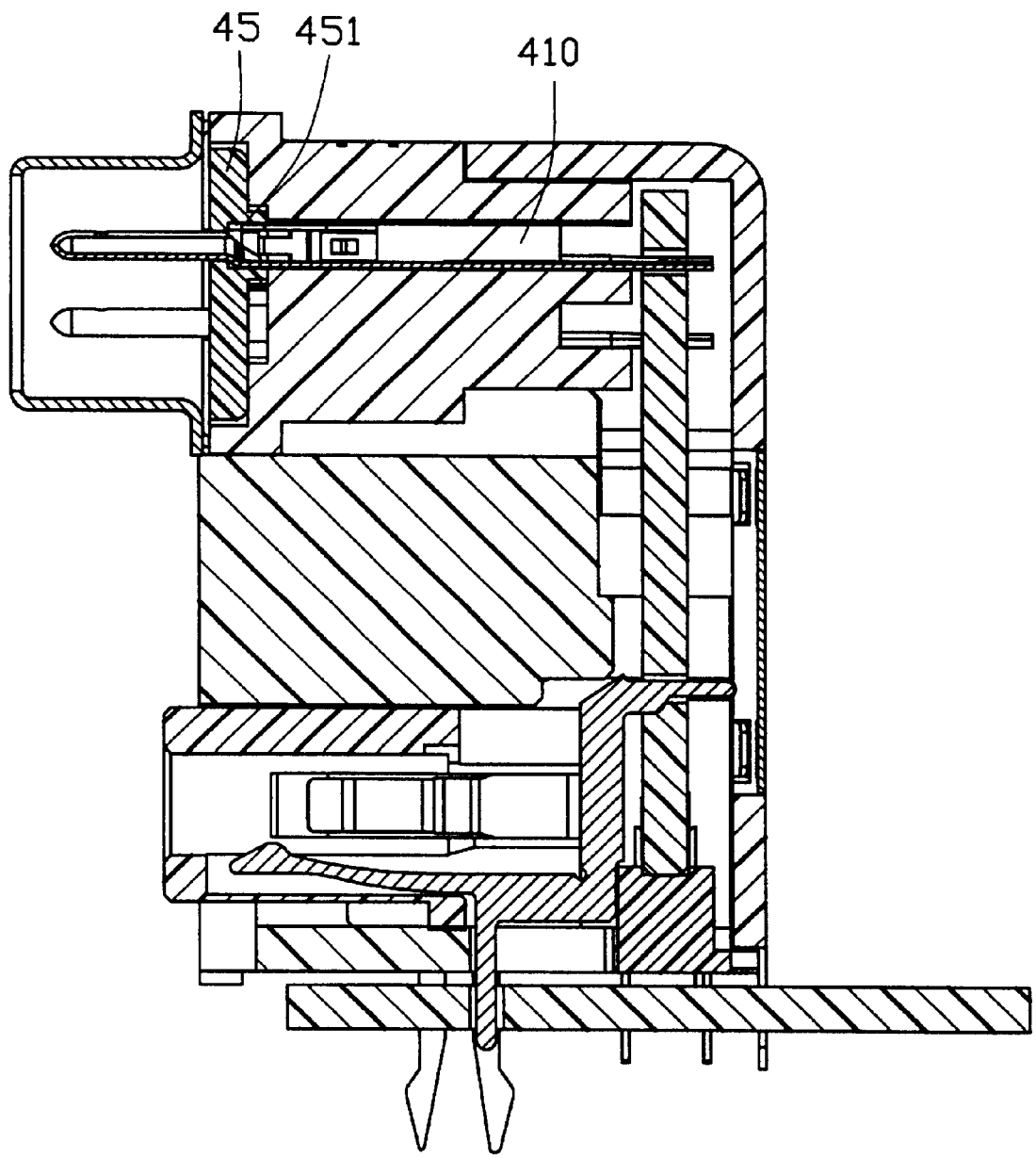
FIG. 16 is a cross-sectional view of the electrical connector assembly of FIG. 2, taken along the line 16—16.
Figure 17:
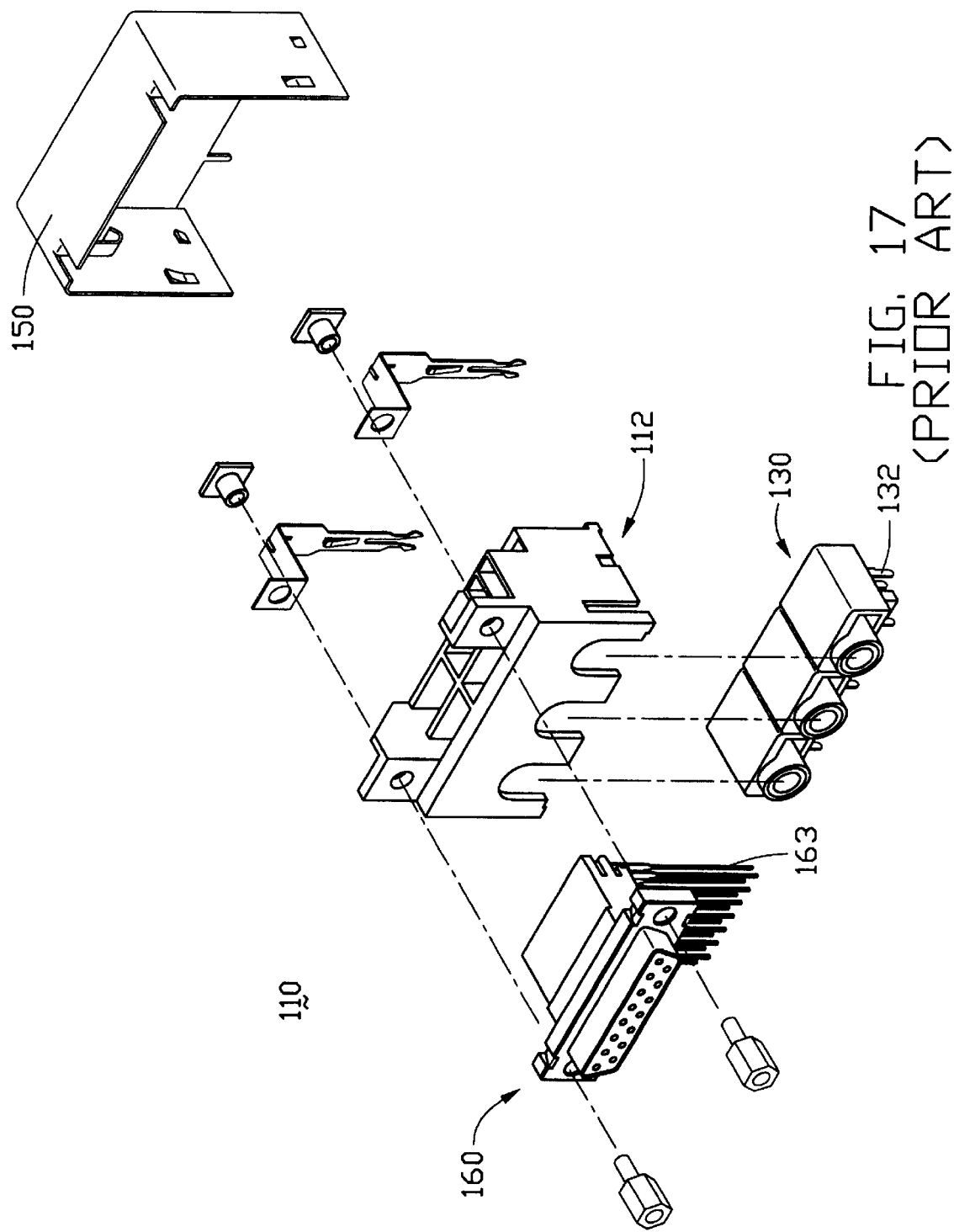
FIG. 17 is an exploded view of a prior art electrical connector assembly.

The D-Sub connector 40, shown in FIGS. 5–6, has a dielectric D-Sub housing 41, a dielectric mask 45 inserted in a front cutout (not labeled) of the housing 41, a conductive shroud 42 fixed to a front of the housing 41, and a plurality of pin contacts 43. The D-Sub housing 41 comprises a thin, elongate front plate 411 and a rectangular body 412 protruding rearward from a rear face 4110 of the front plate 411. A plurality of passageways 410 (see FIG. 16) are defined through the front plate 411 and the body 412 for extension of the pin contacts 43 therethrough. A plurality of mask passageways 451 defined through the mask 45, and aligned with passageways 410, also accept extension of the contacts 43 therethrough. A pair of notches 415 is defined in each of a top edge (not labeled) and a bottom edge (not labeled) of the front plate 411. A second mounting hole 413 is defined through the front plate 411 at each side of the body 412. Rearward ends 431 of the pin contacts 43 extend straight to the rear of the body 412 of the D-Sub housing 41. All the pin contacts 43 are the same, and each has an interferential fit with a corresponding passageway 410 and mask passageway 451. The shroud 42 has a pair of arresting tabs 421 on each of an upper and a lower edges (not labeled) thereof for bendably engaging with the notches 415 of the D-Sub housing 41. The shroud 42 also defines a third mounting hole 425 near each lateral side (not labeled) of the shroud 42.

Figure 7:
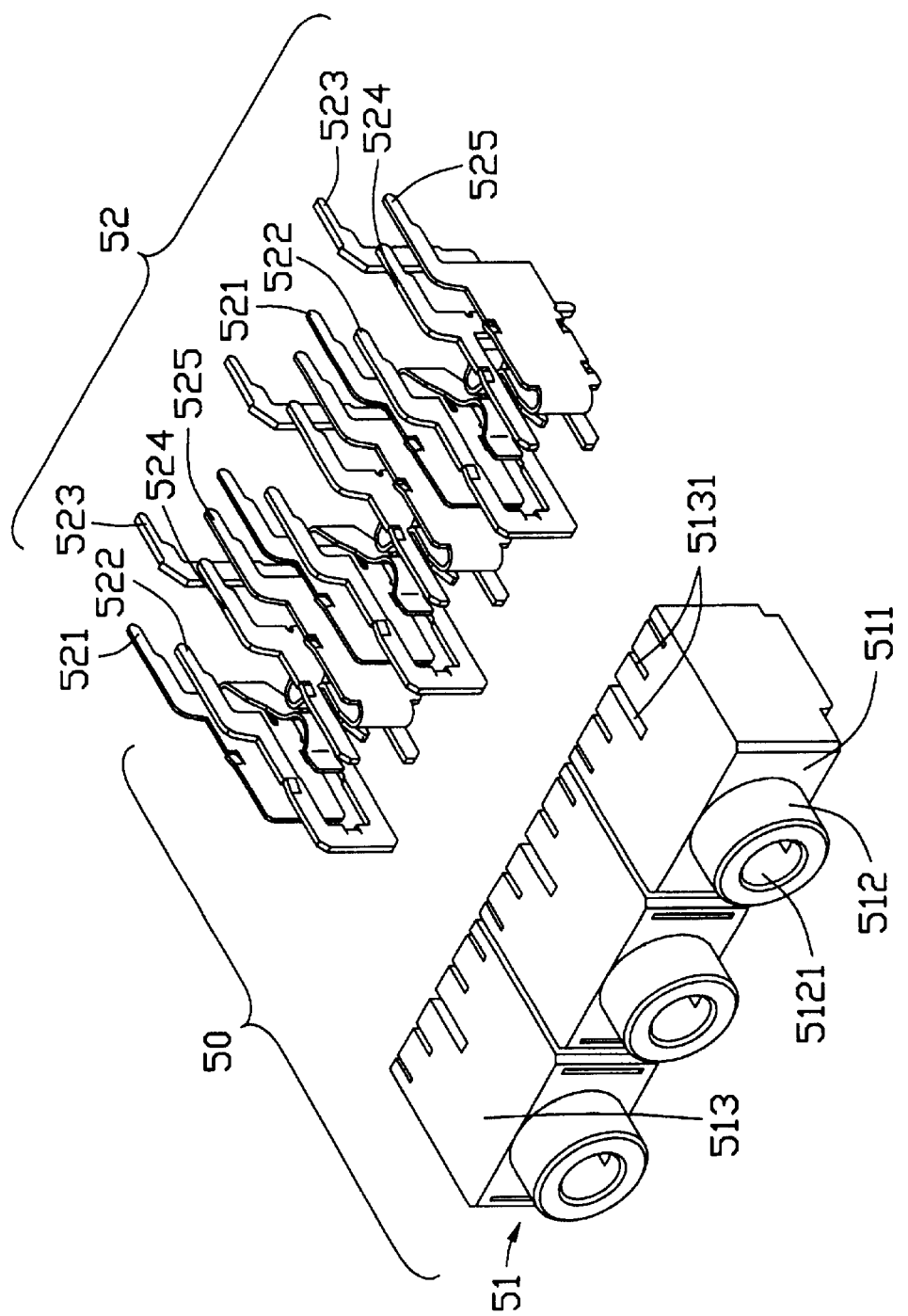
FIG. 7 is an exploded, perspective view of a triplex audio jack subassembly of the electrical connector assembly of FIG. 1, from a front aspect.
Figure 8:
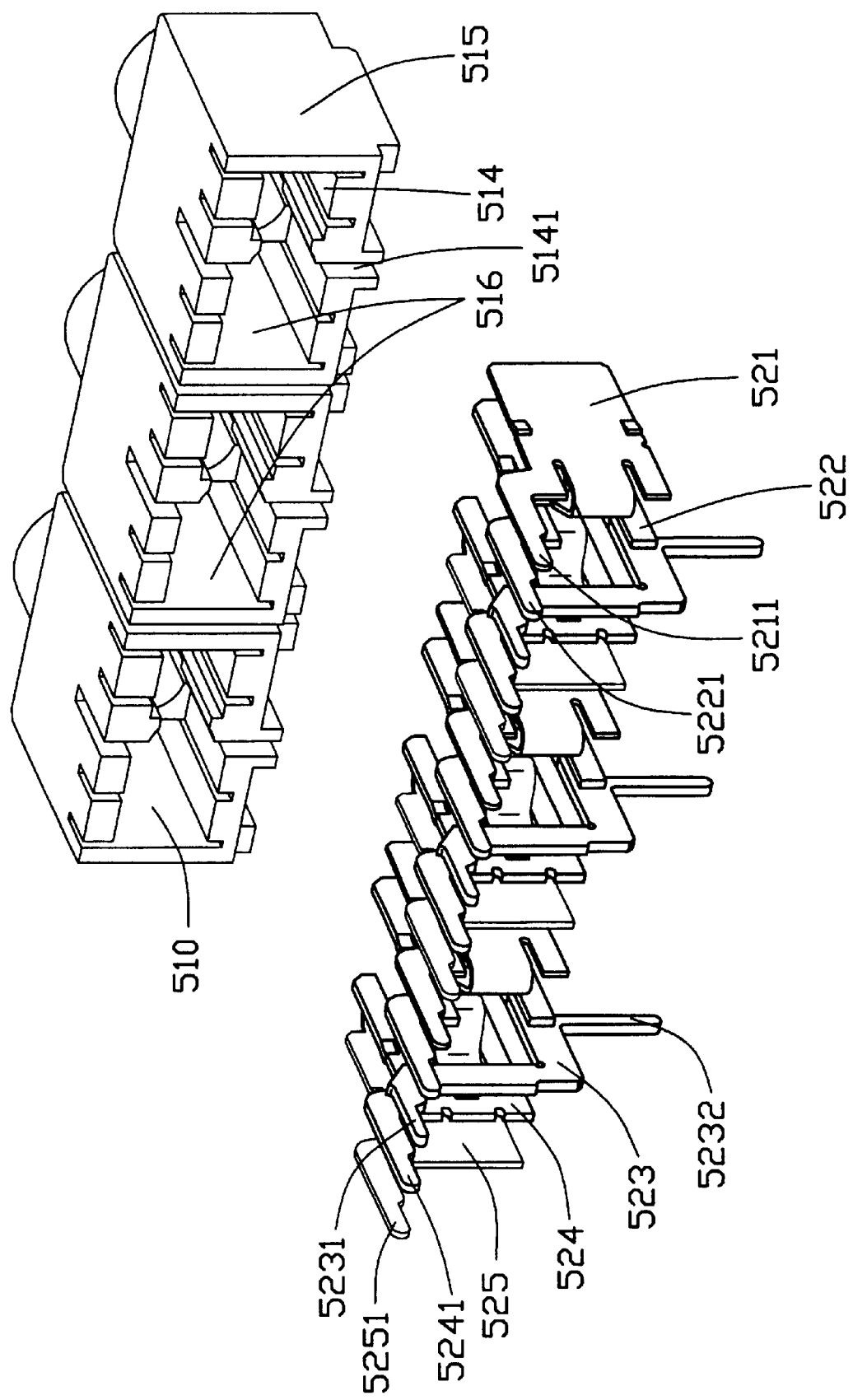
FIG. 8 is an exploded, perspective view of the triplex audio jack subassembly of FIG. 7, from a rear aspect.

Referring to FIGS. 7–8, the triplex audio jack connector 50 comprises a dielectric audio housing 51 generally in the shape of an elongate rectangular block and a plurality of audio contacts 52. The audio housing 51 defines three cavities 510 in a rear side thereof for insertion of the audio contacts 52 and for insertion of a mating plug connector (not shown) therein. Three cylindrical mating tubes 512 protrude forward from a jack front wall 511 of the audio housing 51, each mating tube 512 defining a jack hole 5121 extending therethrough and in communication with a corresponding cavity 510. A jack top wall 513 defines a plurality of top slots 5131 extending forward from a rear edge of the jack top wall 513 for insertion of the audio contacts 52. The audio housing 51 forms a pair of end walls 515 on each end thereof, and also forms two interior walls 516 separating the cavities 510. A jack bottom wall 514 of the housing has three bottom slots 5141 extending forward from a rear side of the jack bottom wall 514 for extension of an audio contact 52 therein.

Figure 9:
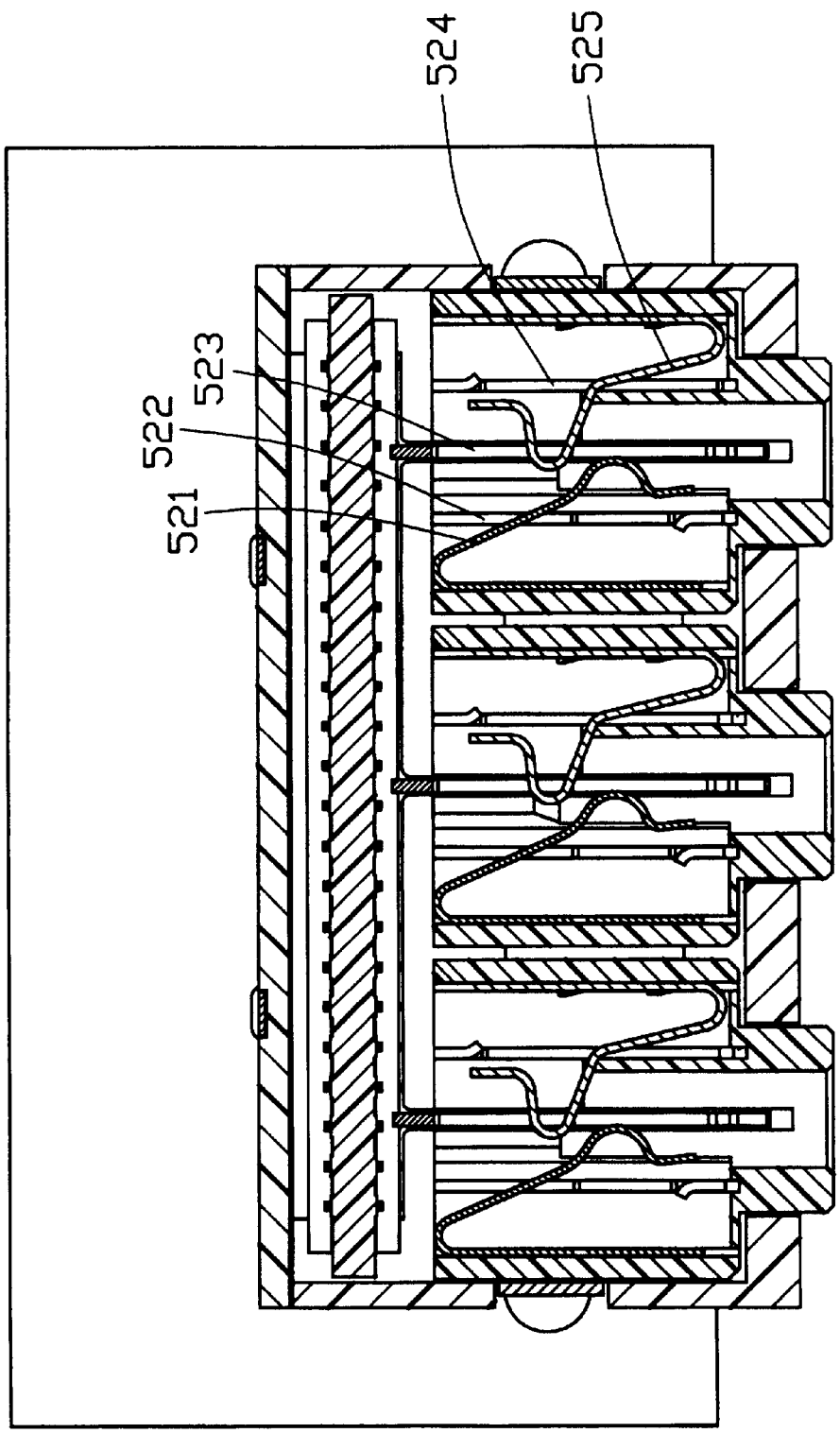
FIG. 9 is a cross-sectional view of the electrical connector assembly taken along line 9—9 of FIG. 2.

Referring to FIGS. 8–9, the audio contacts 52 are of five distinct designs 521,522,523,524 and 525, all well known in the art of audio jacks, with the exception that mounting tails 5211, 5221, 5231, 5241 and 5251 all extend high and to the rear of each audio contact 52. Specifically, in each cavity 510 of the audio housing 51, each of two fixed contacts 524,522 engage with a corresponding one of two moving contacts 525,521, respectively, when no mating plug connector is inserted. When a mating plug connector (not shown) is inserted, the moving contacts 525,521 disengage from the fixed contacts 524,522 and a grounding contact 523 in the cavity engages with a bottom surface of the inserted mating plug connector. Note that the grounding contact 523 has two mounting tails, a first mounting tail 5231 extending to a rear, and a second mounting tail 5232 extending downwardly.

Figure 10:
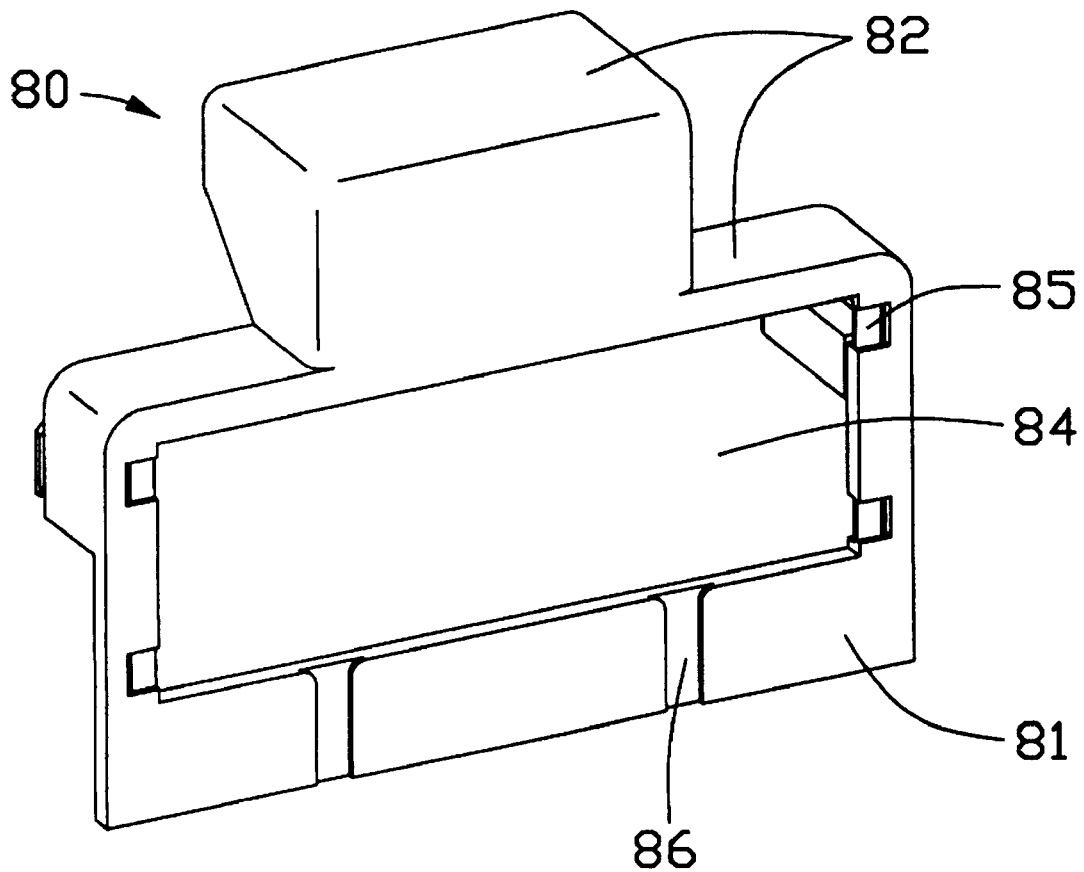
FIG. 10 is a rear aspect perspective view of a rear cover of the electrical connector assembly of FIG. 1.
Figure 11:
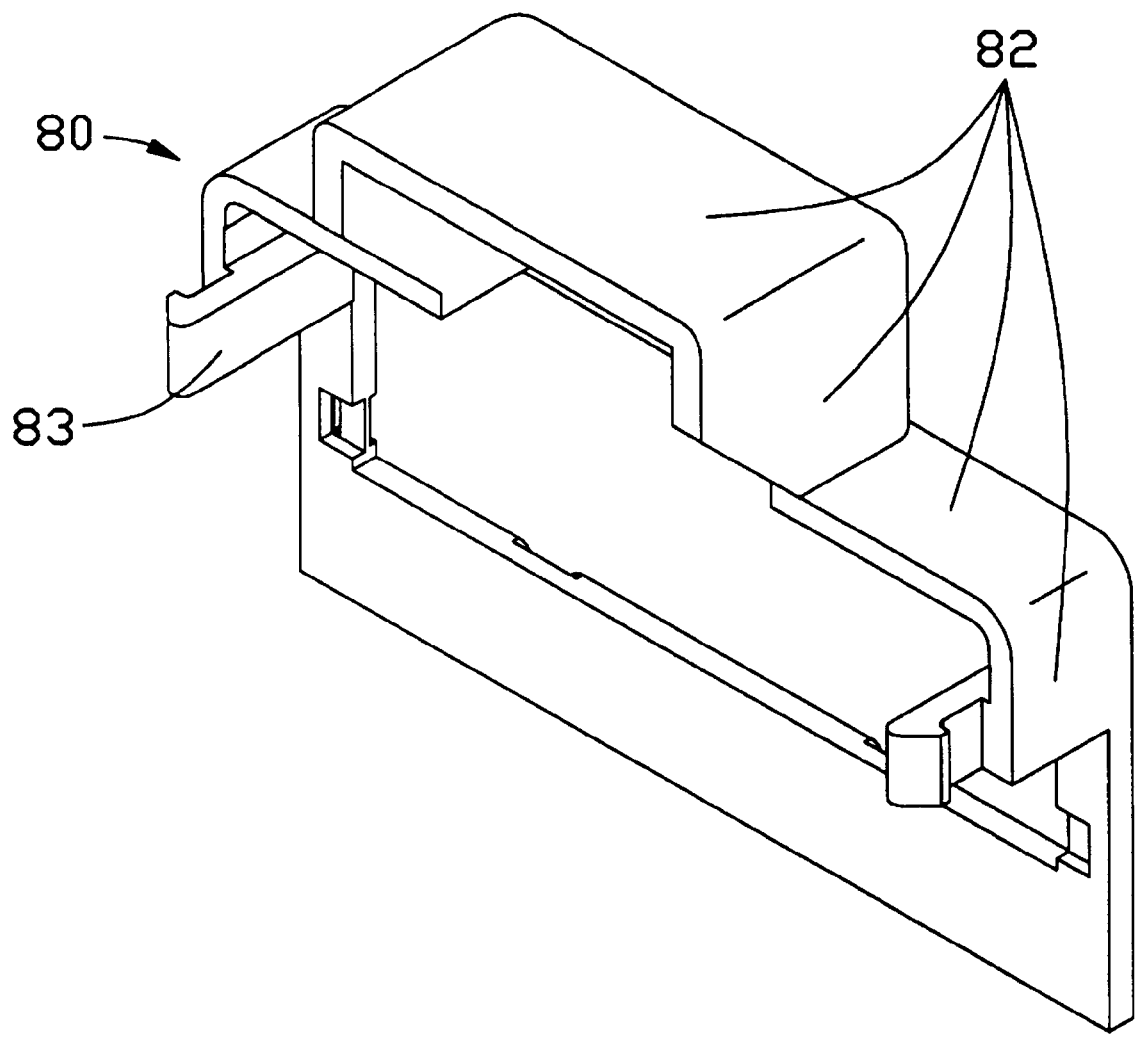
FIG. 11 is a front aspect perspective view of the rear cover of FIG. 10.

As shown in FIGS. 10–11, the rear cover 80 has a rear wall 81 and a molded hood portion 82 projecting forwardly from the rear wall 81 to fit with a rear contour (not labeled) of the assembly housing 30. A pair of elongate side latches 83 projects forward from the hood portion 82. A rectangular rear opening 84 and a pair of apertures 85 to each side of and communicating with the rear opening is defined in the rear wall 81. A pair of grooves 86 is further defined in the rear wall 81, communicating between the rear opening 84 and a lower edge of the rear wall 81.

Figure 12:
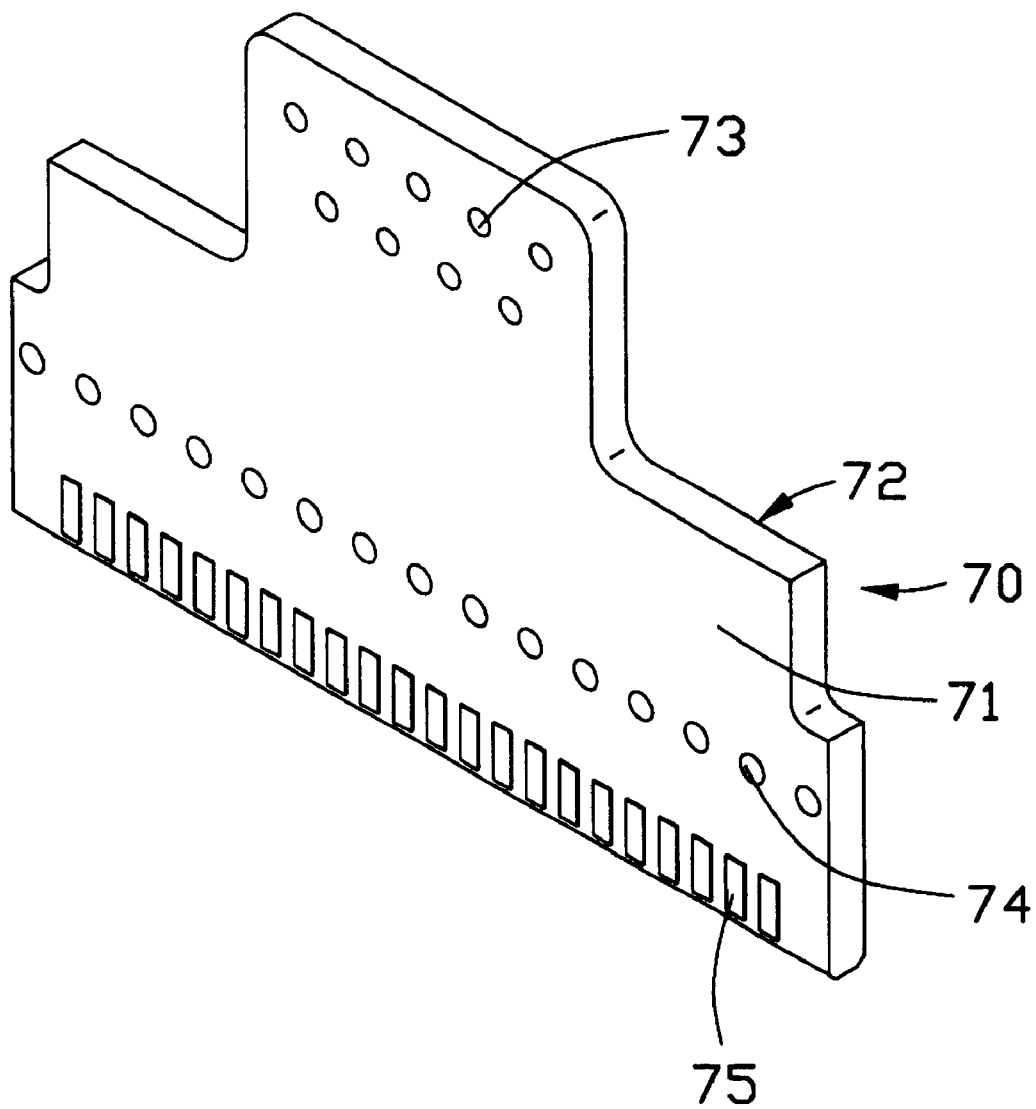
FIG. 12 is a perspective view of a printed circuit board of the electrical connector assembly of FIG. 1.

Referring to FIG. 12, the printed circuit board (PCB) 70 has a front side 71 and a rear side 72 and is cut in a shape to fit inside the hood portion 82 of the rear cover 80. A plurality of first through holes 73 is defined in an upper portion of the PCB 70 and a plurality of second through holes 74 is defined in a lower portion of the PCB 70. A plurality of golden fingers 75 is attached at a lower edge (not labeled) of the front and rear sides 71,72.

The PCB 70 can be multi-layer and can be designed to function as a complete sound card within itself. Thus, it will have printed conductive traces (not shown) and may have numerous other printed components (not shown) on the front and rear sides 71,72, as well as on layers (not shown) between the front and rear sides 71,72. The printed conductive traces and other numerous printed components may interconnect with each other and with the first through holes 73, with the second through holes 74, with the golden fingers 75, and with other components (not shown) mounted on the front and rear sides 71,72 to make up a complete sound card, as is known in the art. The golden fingers 75 will be electrically connected to corresponding first and second through holes 73,74 via appropriate circuitry and electronic components in and mounted on the PCB 70.

Figure 13:
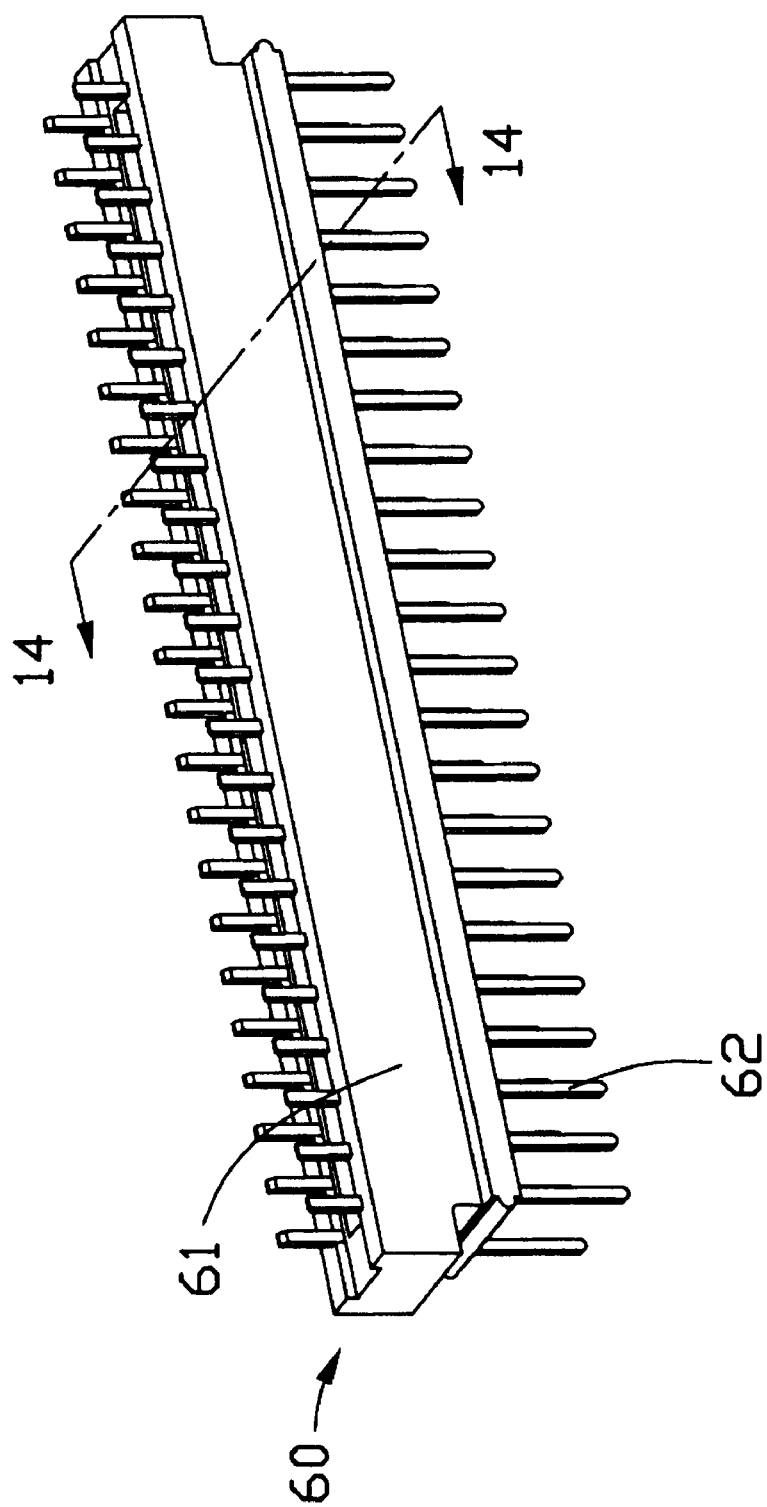
FIG. 13 is a perspective view of a board edge connector subassembly of the electrical connector assembly of FIG. 1.
Figure 14:
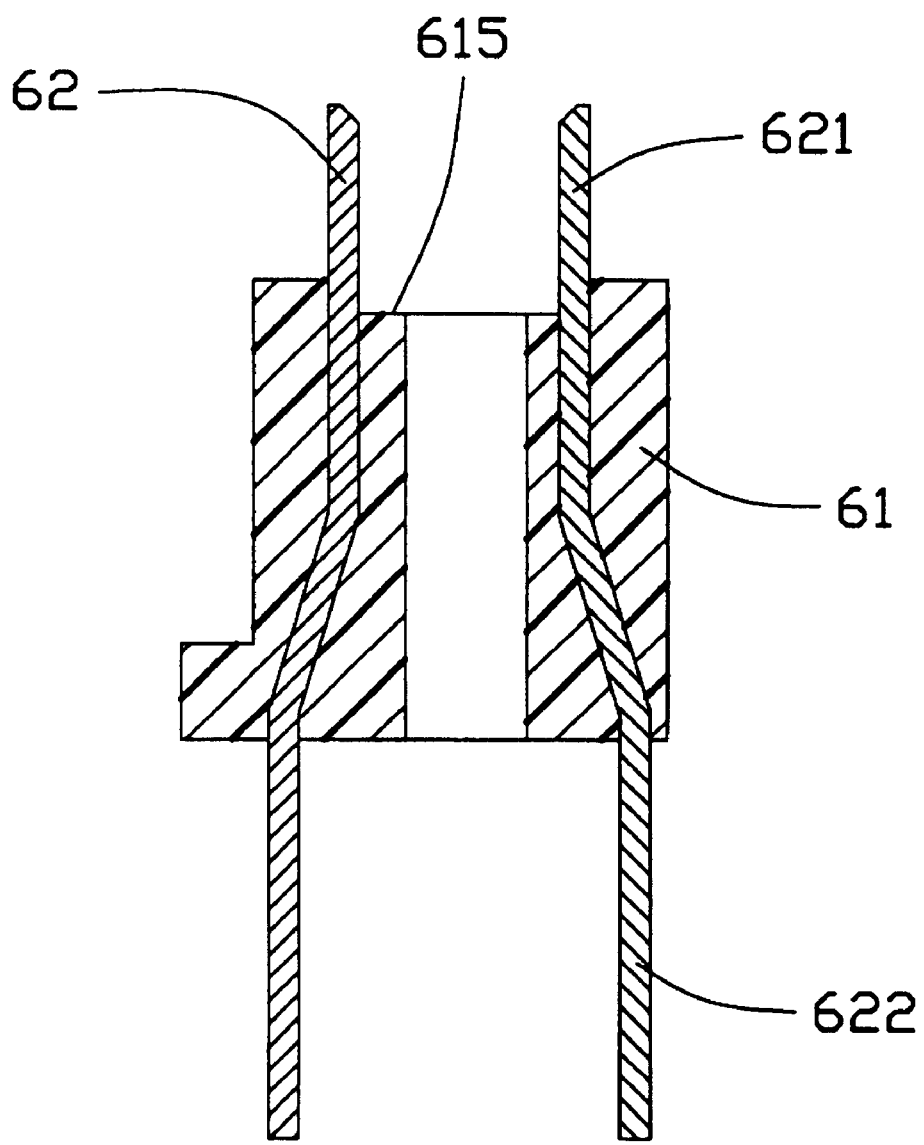
FIG. 14 is a cross-sectional view of the board edge connector of FIG. 13, taken along the line 14—14.

FIGS. 13–14 show the board edge connector 60, which comprises an elongate edge connector housing 61 with a plurality of edge connector terminals 62 insert molded therein and arranged in two rows. Each edge connector terminal 62 has an upper end 621 and a lower end 622. A distance between the rows of upper ends 621 protruding from an upper side 615 of the edge connector housing 61 is slightly greater than a thickness (not labeled) of the PCB 70.

Figure 15:
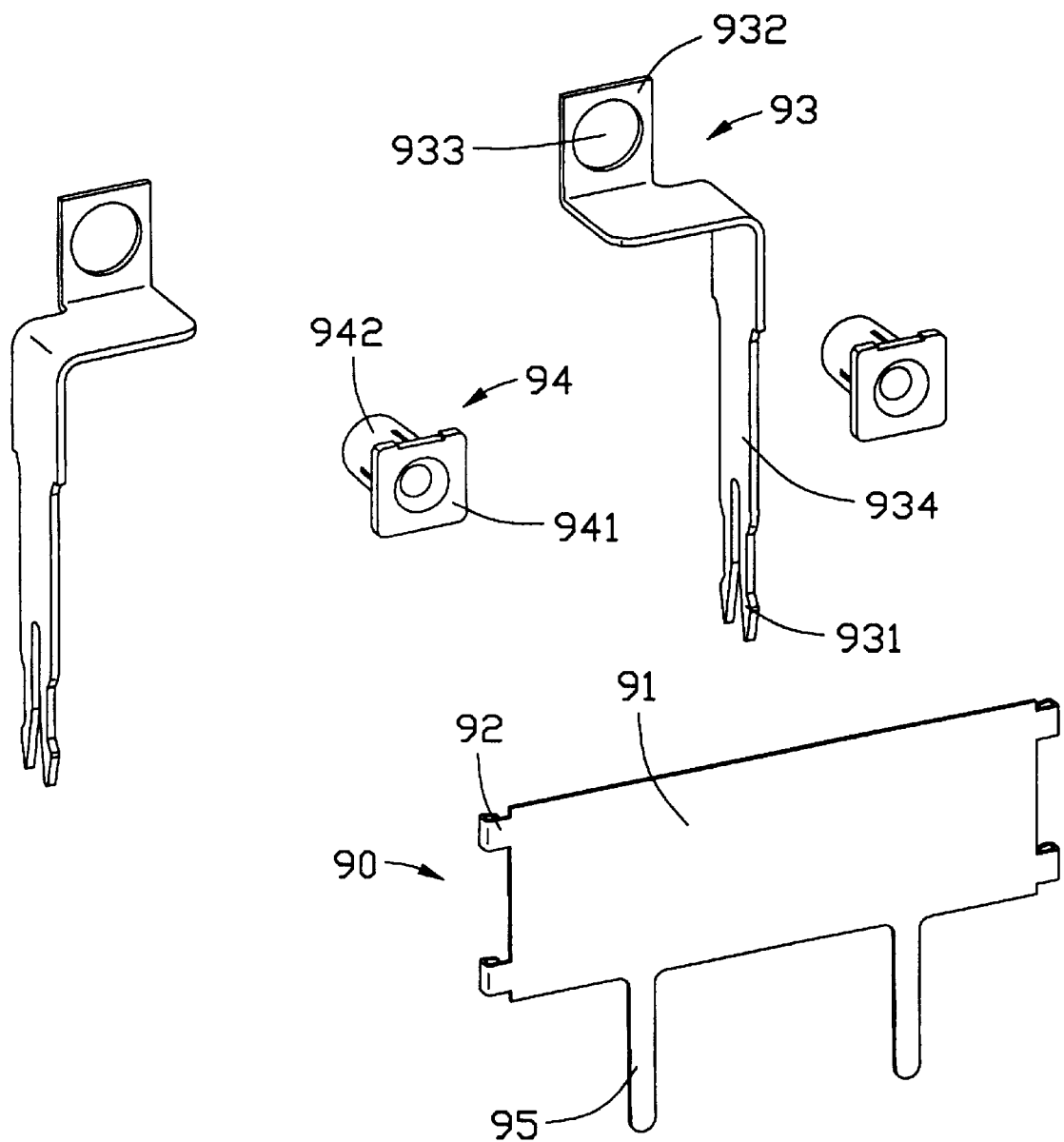
FIG. 15 is a perspective view of a shielding plate, grounding anchors, and locking fasteners of the electrical connector assembly of FIG. 1.

Referring to FIG. 15, the shielding plate 90 comprises a flat, rectangular body plate 91, a pair of connection tabs 92 mounted on each of two lateral edges (not labeled) thereof, and a pair of grounding posts 95 depending from a lower edge (not labeled) of the body plate 91. A pair of grounding anchors 93 each has a forked, lower connecting end 931 for engaging with the motherboard 100, a strap 934 for engaging with the assembly housing 30, and a flat plate portion 932 defining a fourth mounting hole 933 therein for abutting against a rear face (not labeled) of the front ear plate 351 of the assembly housing 30. The grounding anchors 93 are bent to conform to the contours of the assembly housing 30. The pair of locking fasteners 94 each has a flat base 941 and a hollow fastener tube 942 projecting forwardly from the flat base 941.

Referring particularly to FIGS. 1, 2, 8, 9 and 16, in assembly, the PCB 70 is attached to the board edge connector 60, with the lower edge of the PCB 70 fitting between the two rows of the upper ends 621 of the edge connector terminals 62, and abutting the upper side 615 of the edge connector housing 61. The upper ends 621 of the edge connector terminals 62 can be soldered to the golden fingers 75 on the front side 71 and the rear side 72 of the PCB 70.

To assemble the triplex audio jack connector 50, the audio contacts 52 are assembled into the audio housing 51, with two fixed contacts 522,524, two moving contacts 521,525 and one grounding contact 523 fitting into each cavity 510. The mounting tails 5211,5221,5241,5251 and the first mounting tails 5231 each insert into a corresponding top slot 5131 of the audio housing 51. The second mounting tail 5232 of each grounding contact 523 inserts into a corresponding bottom slot 5141.

The assembled triplex audio jack connector 50 is connected to the PCB 70 by inserting mounting tails 5211,5221, 5241,5251 and the first mounting tails 5231 into corresponding second through holes 74 in the lower portion of the PCB 70, and soldering them to the PCB 70. The assembly of the triplex audio jack connector 50, the PCB 70, and the board edge connector 60 is engaged with the assembly housing 30 by inserting them into the insertion cavity 36 of the assembly housing 30, the mating tubes 512 inserting through the port holes 321 and the second mounting tails 5232 of the grounding contacts 523 fitting into the grounding slots 331 of the assembly housing 30. The edge connector housing 61 likewise engages with the connector mounting slot 332. The PCB 70 extends upward out of the insertion cavity 36.

To assemble the D-Sub connector 40, the pin contacts 43 are inserted into the passageways 410 in the D-Sub housing 41, and into the corresponding mask passageways 451 of the mask 45, rearward ends 431 extending straight rearwardly from the housing 41. The shroud 42 is fitted over the front of the D-Sub housing 41 and is clamped thereto by the arresting tabs 421 of the shroud 42 engaging with the notches 415 of the D-Sub housing 41.

The D-Sub connector 40 is assembled to the assembly housing 30 with rearward ends 431 of the pin contacts 43 inserting through the first through holes 73 in the PCB 70, and with the rear face 4110 of the front plate 411 of the D-Sub housing 41 abutting the front ear plate 351 of the mounting ears 35 of the assembly housing 30. The rearward ends 431 of the pin contacts 43 can be soldered to the first through holes 73 of the PCB 70. The grounding anchors 93 are then mounted to the side walls 34 of the assembly housing 30, the straps 934 engaging in the strap slots 341 of the assembly housing 30 and the flat plate portions 932 abutting the rear face (not labeled) of the front ear plates 351 of the assembly housing 30. The first mounting holes 352 of the assembly housing 30, the second mounting holes 413 of the D-Sub housing 41, the third mounting holes 425 of the shroud 42, and the fourth mounting holes 933 of the grounding anchors 93 are all aligned and the fastener tubes 942 of the locking fasteners 94 are inserted through the mounting holes 352, 413, 425, 933 from a rear side thereof, and a front of each fastener tube 942 is flattened against the front face (not labeled) of the shroud 42, firmly fixing the D-Sub connector 40 to the assembly housing 30.

The shielding plate 90 is assembled to the rear cover 80 to cover the rear opening 84 and provide EMI (electromagnetic interference) protection for the electronic circuitry in the PCB 70. The connection tabs 92 and grounding posts 95 of the shielding plate 90 engage with the apertures 85 and fit into the grooves 86, respectively, of the rear cover 80. The rear cover 80 is assembled to the assembly housing 30 with the side latches 83 of the rear cover 80 snappingly engaging with the strap slots 341 of the assembly housing 30. The hood portion 82 of the rear cover 80 fits over the upper portion (not labeled) of the PCB 70, fits around a rear of the body 412 of the D-Sub housing 41, and abuts rear edges of the assembly housing 30.

The electrical connector assembly 20 can be assembled to the motherboard 100 (see FIG. 1) with connecting ends 931 of the grounding anchors 93 engaging with anchor holes 101, second mounting tails 5232 of the audio contacts 52 engaging with the tail holes 102, edge connector terminals 62 engaging with the terminal holes 103, and grounding posts 95 of the shielding plate 90 engaging with the post holes 104. The grounding anchors 93, second mounting tails 5232, edge connector terminals 62 and grounding posts 95 can all be soldered to the corresponding holes 101,102,103 104 in the motherboard 100. Thus the PCB 70 is connected to the motherboard 100 via the golden fingers 75 of the PCB 70 and the board edge connector 60. The shielding plate 90 can be grounded through its connection to a ground in the motherboard 100, providing more effective EMI protection to the PCB 70. The D-Sub connector 40 can be mated with a complementary D-Sub connector (not shown), and the grounding shroud (not shown) of the complementary D-Sub connector (not shown), by contacting the shroud 42 of the D-Sub connector 40, can be grounded to the ground of the motherboard 100 via the pair or grounding anchors 93, which are electrically connected to the conductive shroud 42 of the D-Sub connector 40 by the conductive locking fasteners 94. The triplex audio jack connector 50 can connect with up to three mating audio jack plug connectors (not shown). A shield (not shown) of each mating audio jack plug connector can be grounded to the motherboard 100 ground via the grounding contacts 523 with their second mounting tails 5232 connecting to the ground of the motherboard.

The advantage of the present invention over the prior art is that the PCB 70 can incorporate all the functions of a sound card, making the electrical connector assembly 20 a complete sound card assembly. The electrical connector assembly can then be mounted to a motherboard. Due to its small size, the assembly efficiently provides all the functions of a sound card and associated connectors at a savings in occupied space. Furthermore, the connectors used are standard D-Sub and audio jack connectors with redesigned contacts. These are easily manufactured, and the entire assembly is simple in design and should be easy and inexpensive to manufacture. Note particularly that the pin contacts 43 are all identical; different contacts for a lower row and an upper row are not required.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector assembly, comprising:
    a dielectric housing;
    a first electrical connector;
    a second electrical connector;
    a board edge connector; and
    a printed circuit board having all the functions of a sound card;
    wherein the first and second electrical connectors are mounted on the printed circuit board, the board edge connector is mounted to an edge of the printed circuit board, and the printed circuit board, the first and second electrical connectors, and the board edge connector are all mounted inside the housing with the first and second electrical connectors and the board edge connector all have mating faces exposed outside of the housing for connection to other connectors or printed circuit boards;
    wherein the first electrical connector is a D-Sub connector;
    further comprising at least a grounding anchor electrically connected to a mating shroud of at least one of the first or second electrical connectors, the grounding anchor being electrically engagable with a second printed circuit board to which the electrical connector assembly is mounted, thereby providing a grounding connection between a complementary mating connector mating with the first or second electrical connector and a ground on the second printed circuit board.

2. The electrical connector assembly as claimed in claim 1, wherein and the second electrical connector is an audio jack connector.

3. The electrical connector assembly as claimed in claim 2, wherein the second electrical connector is a triplex audio jack connector.

* * * * *